United States Patent
Ishigami et al.

(10) Patent No.: US 10,690,376 B2
(45) Date of Patent: Jun. 23, 2020

(54) INDOOR UNIT OF AIR-CONDITIONING APPARATUS

(71) Applicant: Mitsubishi Electric Corporation, Tokyo (JP)

(72) Inventors: Katsuya Ishigami, Tokyo (JP); Masato Ishikawa, Tokyo (JP); Akimoto Suzuki, Tokyo (JP); Masahide Kinami, Tokyo (JP); Hisanori Ikeda, Tokyo (JP); Takuya Goto, Tokyo (JP); Yosuke Naito, Tokyo (JP); Shinji Kawai, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 181 days.

(21) Appl. No.: 15/770,780

(22) PCT Filed: Jan. 6, 2016

(86) PCT No.: PCT/JP2016/050212
§ 371 (c)(1),
(2) Date: Apr. 25, 2018

(87) PCT Pub. No.: WO2017/119076
PCT Pub. Date: Jul. 13, 2017

(65) Prior Publication Data
US 2018/0313573 A1 Nov. 1, 2018

(51) Int. Cl.
*F24F 13/28* (2006.01)
*F24F 1/0073* (2019.01)
(Continued)

(52) U.S. Cl.
CPC .......... *F24F 13/28* (2013.01); *B01D 46/0008* (2013.01); *B01D 46/0019* (2013.01);
(Continued)

(58) Field of Classification Search
CPC ............ B01D 46/0008; B01D 46/0019; B01D 46/0028; B01D 46/0038; B01D 46/0045;
(Continued)

(56) References Cited

U.S. PATENT DOCUMENTS

| | | | |
|---|---|---|---|
| 2004/0000160 A1* | 1/2004 | Takashima | B01D 46/002 62/317 |
| 2009/0183471 A1* | 7/2009 | Shibuya | B01D 46/0065 55/282.2 |
| 2011/0048050 A1* | 3/2011 | Moteki | F24F 1/0007 62/263 |

FOREIGN PATENT DOCUMENTS

| | | |
|---|---|---|
| JP | 06-300306 A | 10/1994 |
| JP | 08-285316 A | 11/1996 |

(Continued)

OTHER PUBLICATIONS

International Search Report of the International Searching Authority dated Apr. 12, 2016 for the corresponding International application No. PCT/JP2016/050212 (and English translation).

*Primary Examiner* — Minh Chau T Pham
(74) *Attorney, Agent, or Firm* — Posz Law Group, PLC

(57) ABSTRACT

An indoor unit of an air-conditioning apparatus includes: an air purifying filter including a filter body for air purification, a pair of bearing units, and a pair of protrusions that extend outward from the filter body; and an air filter for dust collection including a pair of shaft units coupled with the respective bearing units, and a pair of supports accommodating the respective protrusions. The protrusions are placed into the respective supports from the direction of the respective shaft units.

3 Claims, 7 Drawing Sheets

(51) Int. Cl.
*F24F 1/0011* (2019.01)
*F24F 1/0025* (2019.01)
*B01D 46/00* (2006.01)

(52) U.S. Cl.
CPC ..... *B01D 46/0028* (2013.01); *B01D 46/0038* (2013.01); *B01D 46/0045* (2013.01); *F24F 1/0011* (2013.01); *F24F 1/0073* (2019.02); *B01D 2267/40* (2013.01); *B01D 2273/30* (2013.01); *B01D 2279/50* (2013.01); *F24F 1/0025* (2013.01)

(58) Field of Classification Search
CPC . B01D 2267/40; B01D 2279/50; F24F 13/28; F24F 1/0073; F24F 1/0011; F24F 1/0025
USPC ..... 55/282, 385.1; 62/262, 317, 263; 29/428
See application file for complete search history.

(56) References Cited

FOREIGN PATENT DOCUMENTS

| | | |
|---|---|---|
| JP | 09-122422 A | 5/1997 |
| JP | 2006-071234 A | 3/2006 |

\* cited by examiner

INDOOR UNIT OF AIR-CONDITIONING APPARATUS

CROSS REFERENCE TO RELATED APPLICATION

This application is a U.S. national stage application of International Application No. PCT/JP2016/050212, filed on Jan. 6, 2016, the contents of which are incorporated herein by reference.

TECHNICAL FIELD

The present invention relates to an indoor unit of an air-conditioning apparatus including an air purifying filter.

BACKGROUND

An example indoor unit of an air-conditioning apparatus including air purifying filter attached on a curved portion of an air filter is disclosed in, for example, Patent Literature 1.

PATENT LITERATURE

Patent Literature 1: Japanese Unexamined Patent Application Publication No. HEI09-122422

In Patent Literature 1, the attachment portion of an air filter must be bent rearward during insertion of a locking pin of the air purifying filter into the attachment portion of the air filter, to facilitate the insertion of the locking pin into the attachment portion. This impairs easy attachment of the air purifying filter in Patent Literature 1. The rearward bending of the air filter in Patent Literature 1 may cause deformation and/or damage of the air filter. Thus, the indoor unit of the air-conditioning apparatus disclosed in Patent Literature 1 may exhibit unreliable performance.

SUMMARY

An object of the present invention, which has been conceived to overcome the above problems, is to provide an indoor unit of an air-conditioning apparatus that allows easy attachment of an air purifying filter and exhibits reliable performance.

The indoor unit of an air-conditioning apparatus according to an embodiment of the present invention includes: an air purifying filter including a filter body for air purification, a pair of bearing units, and a pair of protrusions extending outward from the filter body, and an air filter for dust collection including a pair of shaft units coupled with the respective bearing units, and a pair of supports accommodating the respective protrusions, the pair of protrusions being placed into the respective supports from the direction of the respective shaft units.

According to the present invention, the pair of protrusions provided on the air purifying filter can be placed into the respective supports from the direction of the respective shaft units along the surface of the air filter. Thus, the air purifying filter can be fixed without bending of the air filter. Thus, the indoor unit of the air-conditioning apparatus according to the present invention allows easy attachment of an air purifying filter and exhibits reliable performance.

DETAILED DESCRIPTION

Embodiment 1

Figure 1:
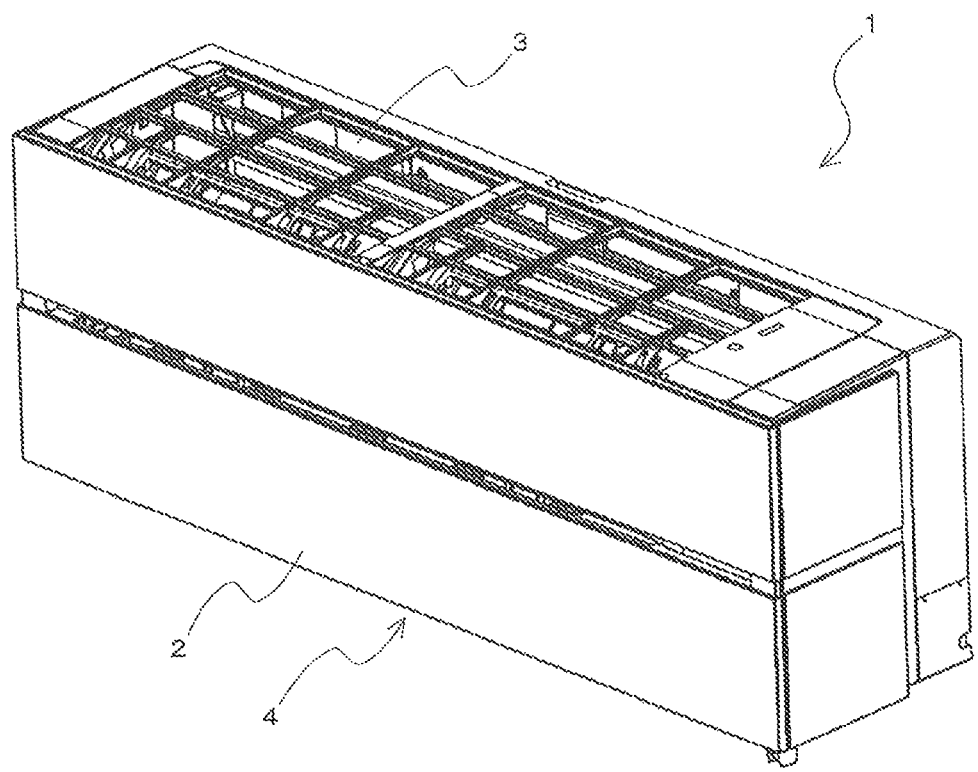
FIG. 1 is a schematic perspective view of an example external configuration of an indoor unit 1 of an air-conditioning apparatus according to Embodiment 1 of the present invention.

An indoor unit 1 of an air-conditioning apparatus according to Embodiment 1 of the present invention will now be described. FIG. 1 is a schematic perspective view of an example external configuration of the indoor unit 1 of an air-conditioning apparatus according to Embodiment 1. In FIG. 1 and the other drawings, the dimensions and shapes of the components or the relationships between the dimensions of the components may differ from those of the actual components. In the drawings, same or similar components are indicated by the same reference signs, or the reference signs of such components may be omitted. In FIG. 1 and the other drawings, the positional relationships of the components of the indoor unit 1 in the front-back, left-right, and top-bottom directions correspond to those of the indoor unit 1 installed for use.

As shown in, for example, FIG. 1, the indoor unit 1 is of a wall-mountable type having a horizontally long rectangular parallelepiped shape. The indoor unit 1 includes a framework or casing 2 of the indoor unit 1 and an intake grille 3 consisting of a frame grating disposed on the upper face of the casing 2. The indoor unit 1 of the air-conditioning apparatus sucks in indoor air through the intake grille 3 and discharge air that has undergone heat exchange inside the indoor unit 1 through an exhaust port 4 provided on the bottom face of the casing 2. The position of the exhaust port 4, which is not visible in the perspective view in FIG. 1, is indicated by the reference sign and arrow.

Figure 2:
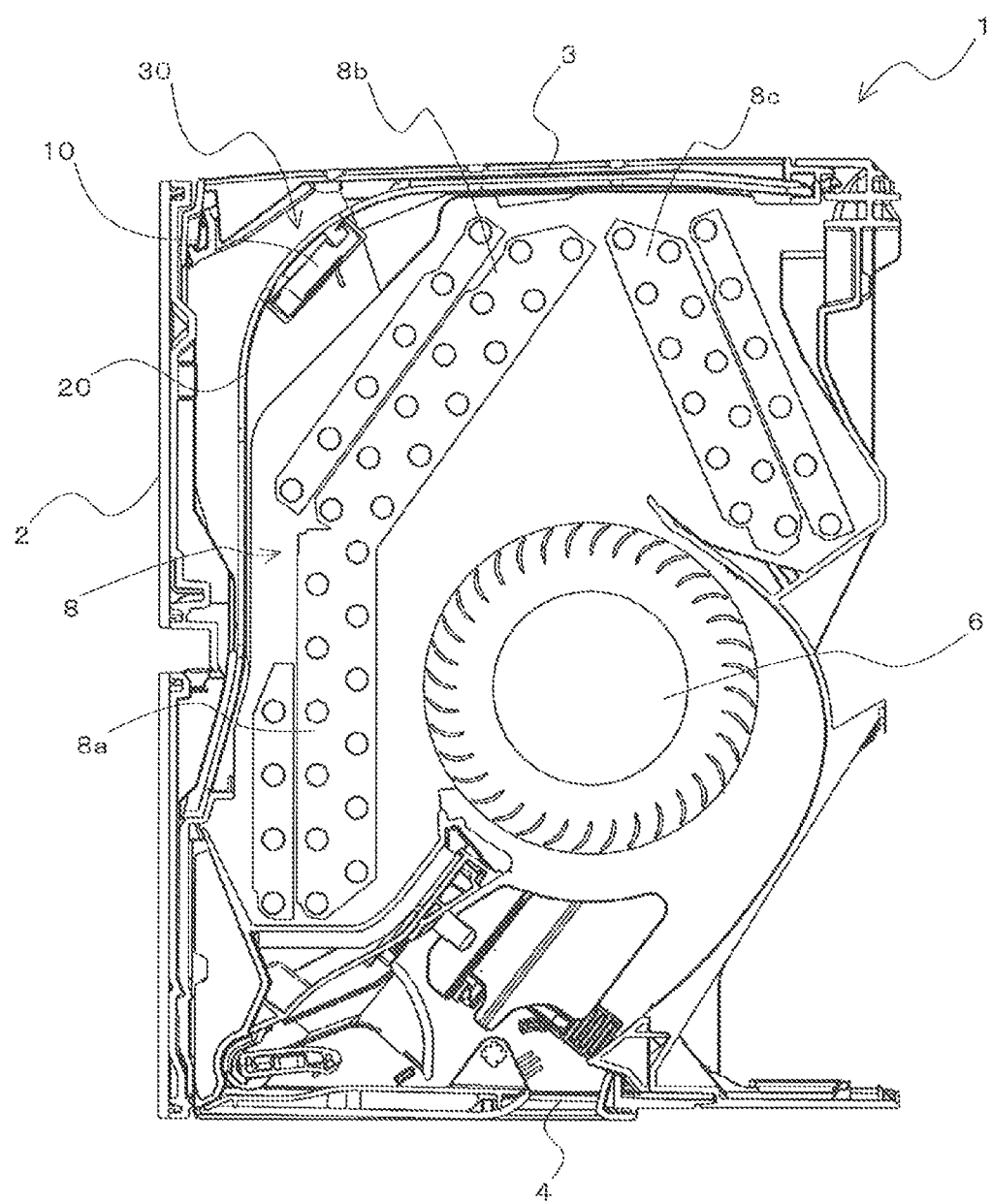
FIG. 2 is a schematic view of an example internal structure on the right side of the indoor unit 1 of the air-conditioning apparatus according to Embodiment 1 of the present invention.

FIG. 2 is a schematic view of an example internal structure on the right side of the indoor unit 1 of the air-conditioning apparatus according to Embodiment 1. The casing 2 accommodates a fan 6, a heat exchanger 8, an air purifying filter 10, and an air filter 20.

The fan 6 is a cross flow fan, for example, and is positioned to introduce indoor air into the interior of the casing 2 and discharge conditioned air from the exhaust port 4. Although not shown in FIG. 1 and the other drawings, the fan 6 includes, for example, an impeller composed of resin, such as thermoplastic resin, a motor rotating the impeller, and a rotary shaft transmitting the rotation of the motor to the impeller.

The heat exchanger 8 is a fin-and-tube heat exchanger including multiple fins disposed in parallel with each other and a heat exchanger tube passing through the fins. The heat exchanger tube is horizontally disposed inside the casing 2. With reference to FIG. 2, the heat exchanger 8, for example, includes a first heat exchanger segment 8a disposed in front of the fan 6, a second heat exchanger segment 8b disposed diagonally forward and upward of the fan 6, and a third heat exchanger segment 8c disposed diagonally upward and rearward of the fan 6. In the heat exchanger 8, the first heat exchanger segment 8a and the second heat exchanger segment 8b are connected with a pipe, and the second heat exchanger segment 8b and the third heat exchanger segment 8c are connected with another pipe. The heat exchanger 8 surrounds the front and top of the fan 6 in side view. The heat exchanger 8 serves as an evaporator during a cooling operation feeding cooling energy to an indoor space and functions as a condenser during a heating operation feeding heating energy to an indoor space. Hereinafter, the condenser may also be referred to as "radiator," and the evaporator may also be referred to as "cooler."

The air purifying filter 10 may include a filter cartridge that has a deodorizing effect and an anti-fungal effect, for example. The air purifying filter 10 is detachable from the air filter 20 and can be periodically replaced with new one for maintaining the deodorizing effect and the anti-fungal effect.

The air filter 20 comprises a dust filter that prevents intrusion of dust from the indoor air into the casing 2. The air filter 20 is disposed in the space between the casing 2 and the heat exchanger 8 and covers the heat exchanger 8, to prevent dust from attaching to the heat exchanger 8 and causing a reduction in the efficiency of heat exchange of the heat exchanger 8. The air filter 20 covers the heat exchanger 8 along the front and top faces of the casing 2, for example, and forms a curved portion 30 near the front and top inner faces of the casing 2. In the indoor unit 1, the air purifying filter 10 disposed on the curved portion 30 of the air filter 20 on the face adjacent to the heat exchanger 8 allows efficiently utilizing the space between the curved portion 30 of the air filter 20 and the heat exchanger 8. Since the indoor air-passing face of the air purifying filter 10 can be disposed to face the air-passing face of the heat exchanger 8, the air purifying filter 10 does not reduce the aerodynamic efficiency of the indoor unit 1.

In the indoor unit 1, the fan 6 is rotationally driven to draw the indoor air to the heat exchanger 8 through the intake grille 3 and the air filter 20, or the air purifying filter 10. The indoor air drawn to the heat exchanger 8 passes between the fins of the heat exchanger 8. The heat exchanger 8 during a cooling operation exchanges heat between the low-temperature, low-pressure two-phase refrigerant flowing through the heat exchanger tube of the heat exchanger 8 and the indoor air flowing between the fins. The heat exchanger 8 during the cooling operation exchanges heat between the high-temperature, high-pressure gaseous refrigerant flowing through the heat exchanger tube of the heat exchanger 8 and the indoor air flowing between the fins. The heat-exchanged air in the heat exchanger 8 is discharged into an indoor space through the exhaust port 4 by the rotationally driven fan 6 to supply cooling energy or heating energy to the indoor space.

The structure of the air purifying filter 10 of the indoor unit 1 of the air-conditioning apparatus according to Embodiment 1 will now be described with reference to FIGS. 3 and 4.

Figure 3:
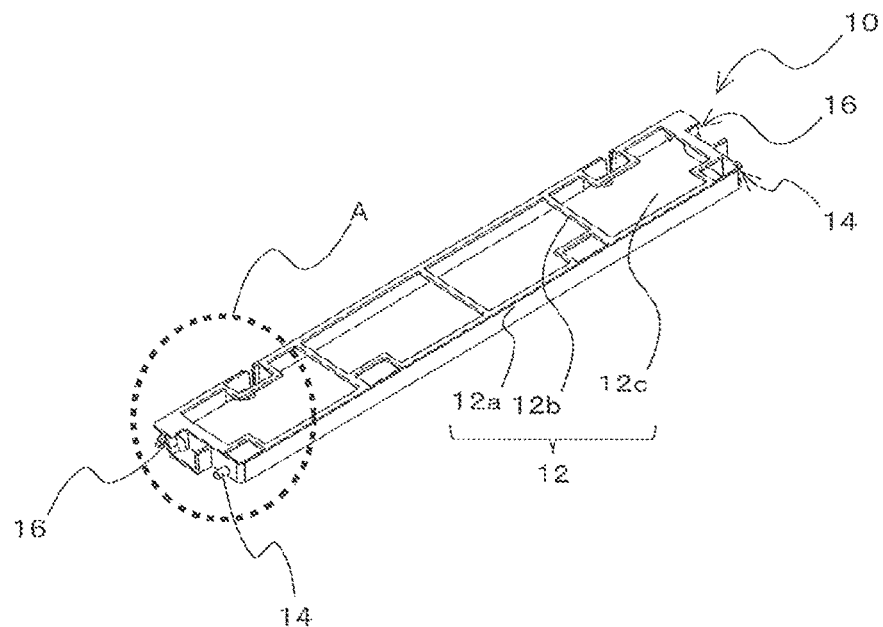
FIG. 3 is a perspective view of an example structure of an air purifying filter 10 according to Embodiment 1 of the present invention.
Figure 4:
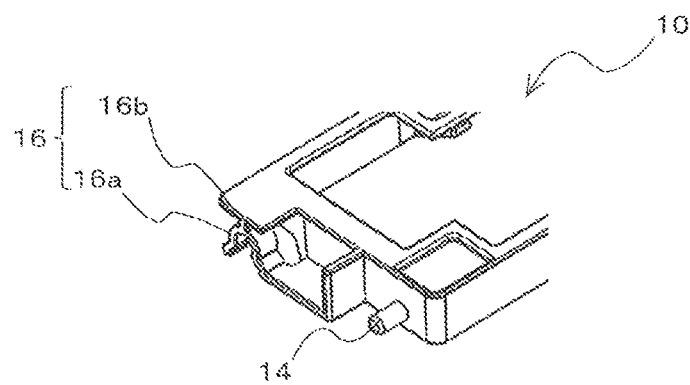
FIG. 4 is an enlarged view of the area A in FIG. 3.

FIG. 3 is a perspective view of an example structure of the air purifying filter 10 according to Embodiment 1. FIG. 4 is an enlarged view of the area A in FIG. 3.

The air purifying filter 10 includes a filter body 12 for air purification including a rectangular outer frame 12a, several inner frames 12b partitioning the interior of the outer frame 12a, and filter portions 12c disposed in the spaces partitioned by the outer frame 12a and the inner frames 12b. The filter body 12 has a pair of protrusions 14 that extend outward from the outer frame 12a of the filter body 12. The pair of protrusions 14 are disposed on the two opposing sides of the outer frame 12a. The outer frame 12a of the filter body 12 includes a pair of bearing units 16, each unit including a C-shaped bearing 16a and a bearing base 16b connecting the bearing 16a and the filter body 12. The bearing units 16 are disposed on the two opposing sides of the outer frame 12a provided with the protrusions 14.

In the air purifying filter 10, the outer frame 12a, the inner frames 12b, the protrusions 14, and the bearing units 16 are composed of rigid resin, such as hard plastic. If the air purifying filter 10 is configured as a filter having a deodorizing effect, the filter portions 12c may consist of mesh filters containing a deodorizer, for example.

The structure of the air filter 20 of the indoor unit 1 of the air-conditioning apparatus according to Embodiment 1 will now be described with reference to FIGS. 5 to 9.

Figure 5:
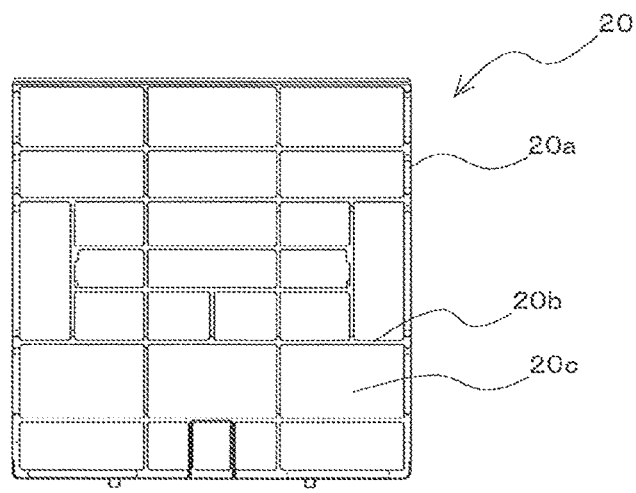
FIG. 5 is a schematic view of an example structure of the front face of an air filter 20 according to Embodiment 1 of the present invention.
Figure 6:
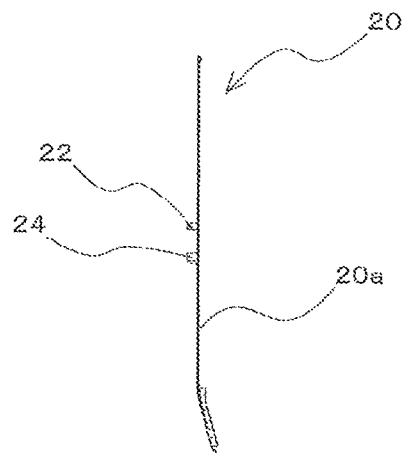
FIG. 6 is a schematic view of an example structure of the side face of the air filter 20 according to Embodiment 1 of the present invention.
Figure 7:
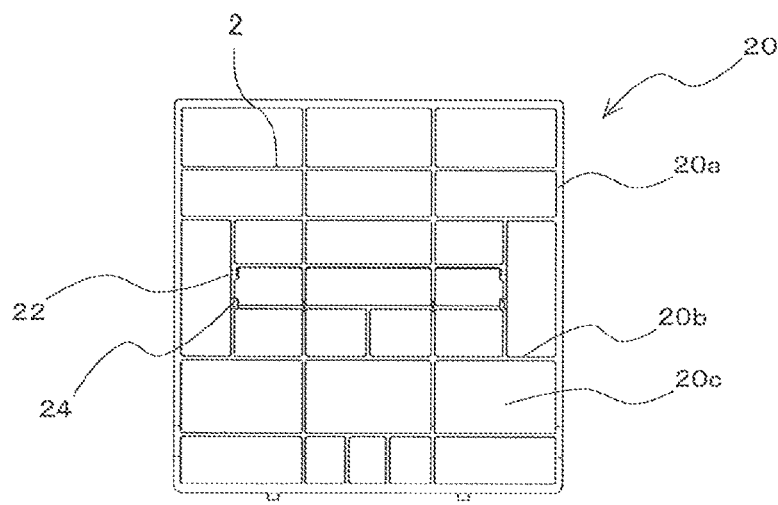
FIG. 7 is a schematic view of an example structure of the back face of the air filter 20 according to Embodiment 1 of the present invention.
Figure 8:
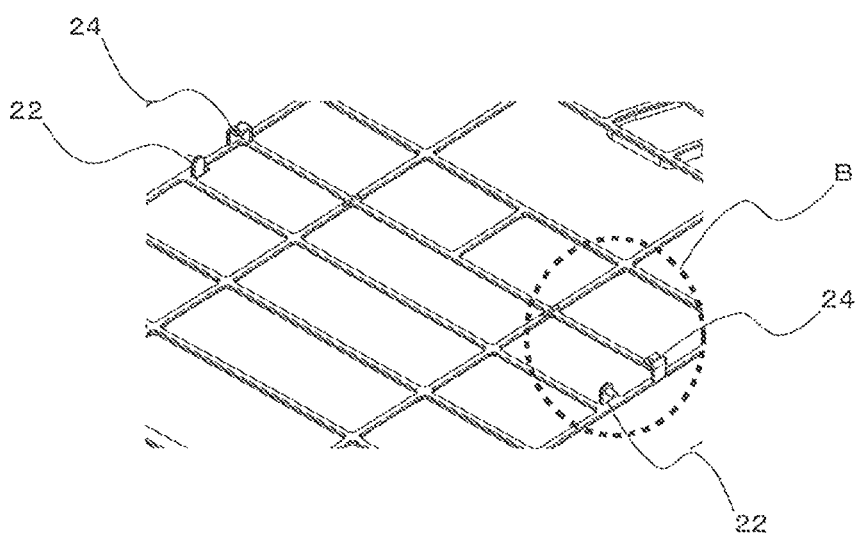
FIG. 8 is an enlarged schematic view of a partial structure of the back face of the air filter 20 according to Embodiment 1 of the present invention.
Figure 9:
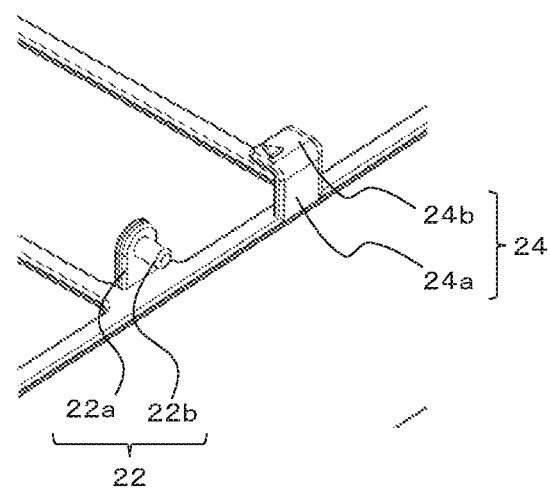
FIG. 9 is an enlarged view of the area B in FIG. 8.

FIG. 5 is a schematic view of an example structure of the front face of the air filter 20 according to Embodiment 1. FIG. 6 is a schematic view of an example structure of the side face of the air filter 20 according to Embodiment 1. FIG. 7 is a schematic view of an example structure of the back face of the air filter 20 according to Embodiment 1. FIG. 8 is a partially enlarged schematic view of the structure of the back face of the air filter 20 according to Embodiment 1. FIG. 9 is an enlarged view of the area B in FIG. 8. Hereinafter, the "front face" and "back face" of the air filter 20 respectively correspond to the "front face" and "back face" of the air filter 20 attached to the indoor unit 1.

With reference to FIGS. 5 to 7, the air filter 20 includes a rectangular outer frame 20a, multiple linear inner frames 20b disposed inside the outer frame 20a and partitioning the inside of the outer frame 20a, and multiple rectangular filter portions 20c disposed in the spaces partitioned by the outer frame 20a and the inner frames 20b. The outer frame 20a and the inner frames 20b are composed of flexible resin, such as soft plastic. The filter portions 20c are mesh filters, for example.

With reference to FIGS. 8 and 9, the back face of the air filter 20 is provided with a pair of shaft units 22 supported by the bearings 16a of the air purifying filter 10 in a rotatable manner and a pair of supports 24 that receive the protrusions 14 of the air purifying filter 10. The shaft units 22 and the supports 24 are positioned such that the areas surrounded by the shaft units 22 and the supports 24 have a rectangular shape in view from the back face of the air filter 20. The shaft units 22 are disposed on the inner frames 20b in the same straight line in view from the back face of the air filter 20. The supports 24 are disposed on the inner frames 20b in the same straight line in view from the back face of the air filter 20.

The shaft units 22 each include a planer shaft base 22a extending away from the back face of the air filter 20 and a columnar shaft 22b extending outward from the face of the shaft base 22a.

The protrusions 14 of the air purifying filter 10 are placed into the supports 24 from the direction of the shaft units 22 of the air filter 20 and along the back face of the air filter 20. The supports 24, for example, each have an L-shaped first wall 24a extending away from the back face of the air filter 20 in view from the back face of the air filter 20, and a rectangular second wall 24b connected to the upper portion of the first wall 24a. The first wall 24a can restrict the movement of the air purifying filter 10 in the direction away from the shaft units 22 of the air filter 20 and in the direction of extending of the protrusions 14 of the air purifying filter 10. The second wall 24b can restrict the movement of the air purifying filter 10 in the direction away from the back face of the air filter 20.

The air purifying filter 10 attached to the air filter 20 of the indoor unit 1 of the air-conditioning apparatus according to Embodiment 1 will now be described with reference to FIGS. 10 to 13.

Figure 10:
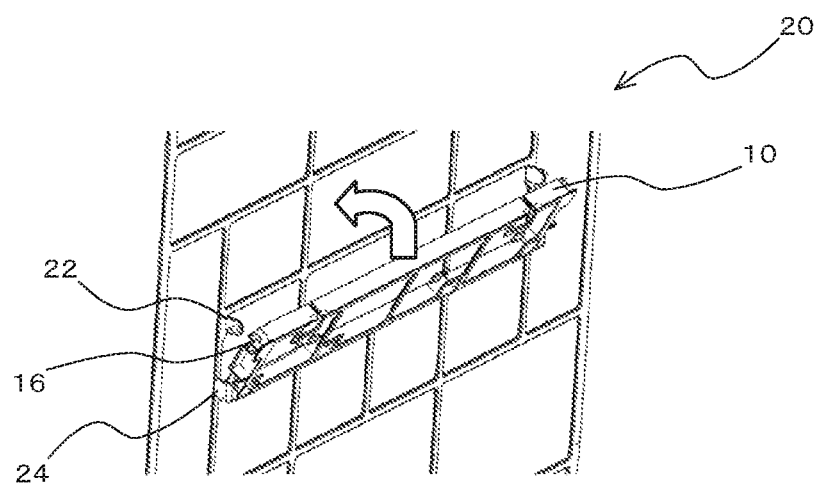
FIG. 10 is a schematic perspective view of the air purifying filter 10 being attached to the air filter 20 of the indoor unit 1 of the air-conditioning apparatus according to Embodiment 1 of the present invention.
Figure 11:
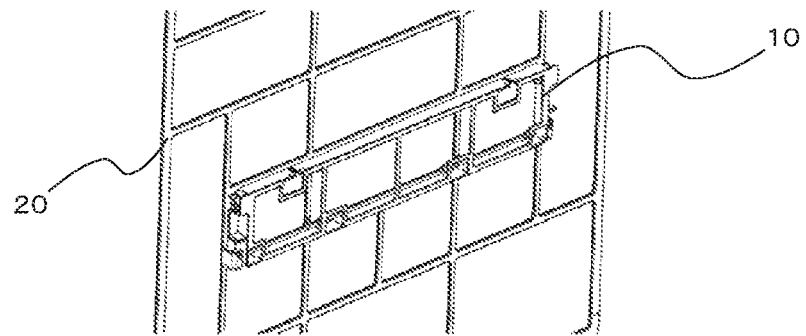
FIG. 11 is a schematic perspective view of the air purifying filter 10 attached to the air filter 20 of the indoor unit 1 of the air-conditioning apparatus according to Embodiment 1 of the present invention.
Figure 12:
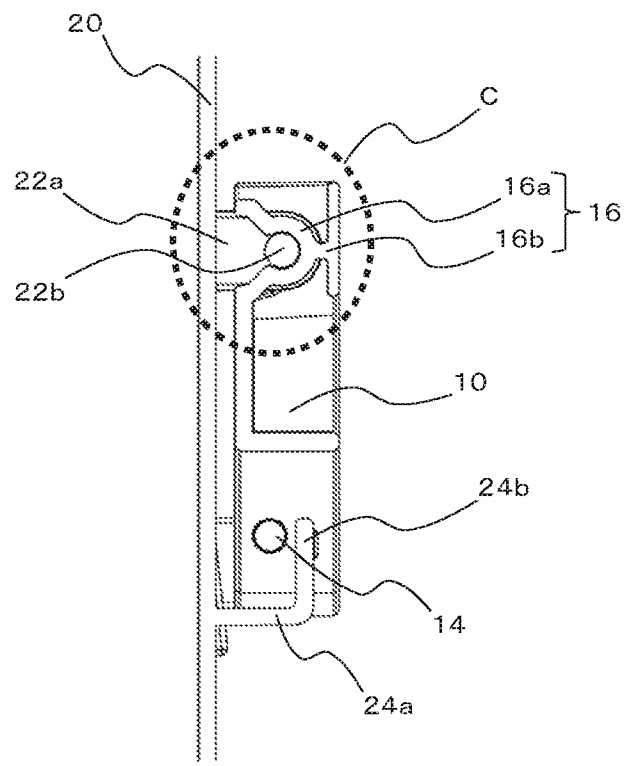
FIG. 12 is a schematic side view of the air purifying filter 10 attached to the air filter 20 of the indoor unit 1 of the air-conditioning apparatus according to Embodiment 1 of the present invention.
Figure 13:
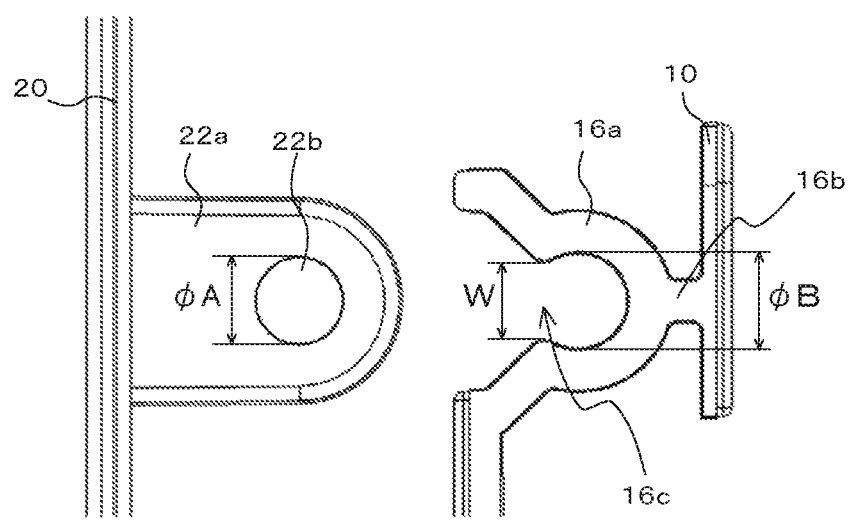
FIG. 13 is an exploded schematic view of the area C in FIG. 12.

FIG. 10 is a schematic perspective view of the air purifying filter 10 being attached to the air filter 20 of the indoor unit 1 of the air-conditioning apparatus according to Embodiment 1. FIG. 11 is a schematic perspective view of the air purifying filter 10 attached to the air filter 20 of the indoor unit 1 of the air-conditioning apparatus according to Embodiment 1. FIG. 12 is a schematic side view of the air purifying filter 10 attached to the air filter 20 of the indoor unit 1 of the air-conditioning apparatus according to Embodiment 1. FIG. 13 is an exploded schematic view of the area C in FIG. 12.

With reference to FIG. 10, the protrusions 14 of the air purifying filter 10 are placed into the respective supports 24 of the air filter 20 from the direction of the shaft units 22 of the air filter 20 and along the back face of the air filter 20. After the protrusions 14 of the air purifying filter 10 are placed into the respective supports 24 of the air filter 20, the air purifying filter 10 is turned around the protrusions 14 of the air purifying filter 10 in the direction indicated by the thick arrow in FIG. 10 until the shafts 22b of the air filter 20 are fit to the respective bearings 16a of the air purifying filter 10, as illustrated in FIGS. 11 and 12.

With reference to FIG. 13, the diameter φA of the shaft units 22 of the air filter 20 is designed to be larger than the width W of openings 16c in the bearings 16a of the air purifying filter 10 and smaller than the inner diameter φB of the bearings 16a of the air purifying filter 10. By designing the shafts 22b of the air filter 20 to have a diameter φA larger than the width W of the openings 16c of the bearings 16a of the air purifying filter 10, and placing the shafts 22b of the air filter 20 onto the flexural bearings 16a, it is possible to avoid detachment of the shaft units 22 of the air filter 20. The air purifying filter 10 can be readily detached from the flexural bearings 16a. Since the shafts 22b of the air filter 20 is designed to have a diameter φA smaller than the inner diameter φB of the bearings 16a of the air purifying filter 10, the bearing 16a of the air purifying filter 10 can rotatably support the shafts 22b of the air filter 20.

After the shafts 22b of the air filter 20 are attached to the bearings 16a of the air purifying filter 10, the shaft bases 22a of the air filter 20 restrict the inward movement of the respective bearings 16a of the air purifying filter 10. This prevents accidental detachment of the air purifying filter 10 due to flexure of the air filter 20.

The air purifying filter 10 and the air filter 20 attached to the indoor unit 1 of the air-conditioning apparatus according to Embodiment 1 will now be described with reference to FIGS. 14 and 15.

Figure 14:
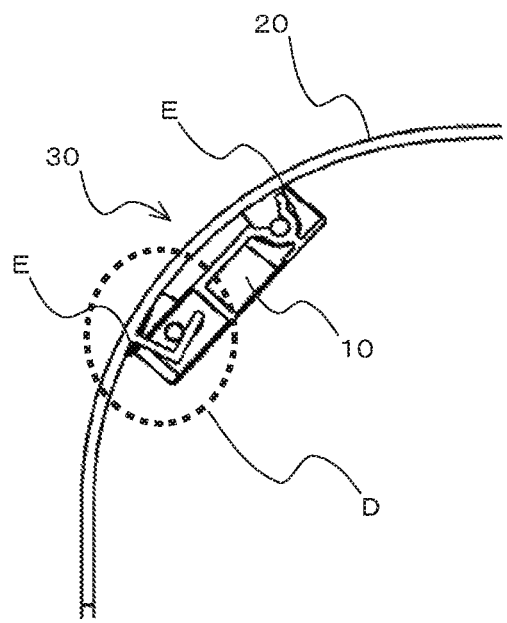
FIG. 14 is a schematic side view of the air purifying filter 10 and the air filter 20 attached to the indoor unit 1 of the air-conditioning apparatus according to Embodiment 1 of the present invention.
Figure 15:
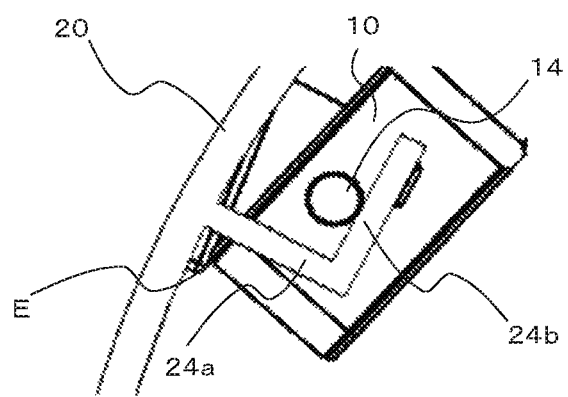
FIG. 15 is an exploded schematic view of the area D in FIG. 14.

FIG. 14 is a schematic side view of the air purifying filter 10 and the air filter 20 attached to the indoor unit 1 of the air-conditioning apparatus according to Embodiment 1. FIG. 15 is an exploded schematic view of the area D in FIG. 14.

The bearings 16a of the air purifying filter 10 can rotatably support the respective shafts 22b of the air filter 20, as described above. The movement of the protrusions 14 of the air purifying filter 10 disposed in the respective supports 24 of the air filter 20 is restricted by the first walls 24a and the second walls 24b of the supports 24, as described above, but the movement inside the supports 24 is not restricted. The air filter 20 provided with the air purifying filter 10 is curved such that the portion of the air purifying filter 10 protrudes, and is then attached to the indoor unit 1 of the air-conditioning apparatus. The curved air filter 20 causes the air purifying filter 10 to move away from the air filter 20 with the two opposing edges E of the air purifying filter 10 in contact with the air filter 20 and the shafts 22b serving as fulcrums. The protrusions 14 of the air purifying filter 10 move inside the supports 24 until they come into contact with the second walls 24b of the supports 24, and they come into contact with the second walls 24b of the supports 24 and are fixed. Thus, the indoor unit 1 of the air-conditioning apparatus according to Embodiment 1 can firmly fix the air purifying filter 10 to the back face of the air filter 20.

As described above, the indoor unit 1 of the air-conditioning apparatus according to Embodiment 1 includes an air purifying filter 10 including a filter body 12 for air purification, a pair of bearing units 16, and a pair of protrusions 14 that extend outward from the filter body 12; and an air filter 20 for dust collection including a pair of shaft units 22 coupled with the respective bearing units 16 and a pair of supports 24 accommodating the respective protrusions 14. The protrusions 14 are placed into the respective supports 24 from the direction of the respective shaft units 22.

As described above, the protrusions 14 provided on the air purifying filter 10 can be placed into the respective supports 24 from the direction of the respective shaft units 22 along the surface of the air filter 20, and thus, flexure of the air filter 20 is not required for the fixing of the air purifying filter 10. Thus, the configuration described above can provide an indoor unit of an air-conditioning apparatus that allows easy attachment of the air purifying filter 10 and exhibits reliable performance.

The indoor unit 1 of the air-conditioning apparatus according to Embodiment 1 includes the casing 2 accommodating the air purifying filter 10 and the air filter 20. The air filter 20 disposed inside the casing 2 has the curved portion 30. The air purifying filter 10 can be disposed on the curved portion 30. This configuration can allow efficiently utilizing the space between the curved portion 30 of the air filter 20 and the heat exchanger 8.

In the indoor unit 1 of the air-conditioning apparatus according to Embodiment 1, the shaft units 22 each include a shaft base 22a extending in a direction away from the air filter 20 and a shaft 22b extending outward from the shaft base 22a. According to the above configuration, the shaft bases 22a of the air filter 20 restrict the inward movement of the bearings 16a of the air purifying filter 10. This can prevent accidental detachment of the air purifying filter 10 due to flexure of the air filter 20.

Other Embodiments

Various modifications of the embodiments described above can be provided without departing from the scope of the present invention. For example, the embodiments described above can be applied to refrigeration cycle apparatuses, such as dehumidifiers and driers, including air purifying filters, other than the air-conditioning apparatus.

The invention claimed is:

1. An indoor unit of an air-conditioning apparatus comprising:
 an air purifying filter including
  a filter body for air purification,
  a pair of bearing units each including a bearing having a C-shape, and
  a pair of protrusions extending outward from the filter body; and
 an air filter for dust collection including
  a pair of shaft units coupled with the bearing having the C-shape, and
  a pair of supports,
  the pair of supports each including
   a first wall portion having an L-shape and extending in a direction away from the air filter, and
   a second wall portion having a rectangular shape and being connected to the first wall portion,
  the pair of protrusions being placed into the respective supports from a direction of the respective shaft units.

2. The indoor unit of an air-conditioning apparatus of claim 1, further comprising
 a casing accommodating the air purifying filter and the air filter, wherein,
 the air filter disposed inside the casing has a curved portion, and
 the air purifying filter is disposed on the curved portion.

3. The indoor unit of an air-conditioning apparatus of claim 1, wherein,
 the shaft units each include
  a shaft base extending in the direction away from the air filter, and
  a shaft extending outward from the shaft base.

* * * * *